US012627202B2

(12) United States Patent
Xu et al.

(10) Patent No.: US 12,627,202 B2
(45) Date of Patent: May 12, 2026

(54) POWER ASSEMBLY AND ELECTRIC VEHICLE

(71) Applicant: Huawei Digital Power Technologies Co., Ltd., Shenzhen (CN)

(72) Inventors: Haisong Xu, Shanghai (CN); Lingkun Zhu, Shanghai (CN); Yibo Wang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 271 days.

(21) Appl. No.: 18/455,288

(22) Filed: Aug. 24, 2023

(65) Prior Publication Data

US 2023/0402901 A1     Dec. 14, 2023

Related U.S. Application Data

(63) Continuation of application No. PCT/CN2021/078274, filed on Feb. 26, 2021.

(51) Int. Cl.
H02K 9/197          (2006.01)
H02K 9/22          (2006.01)

(52) U.S. Cl.
CPC ............. H02K 9/197 (2013.01); H02K 9/225 (2021.01)

(58) Field of Classification Search
None
See application file for complete search history.

(56) References Cited

U.S. PATENT DOCUMENTS 5,156,579 A      10/1992  Wakuta et al.
8,183,727 B2 *   5/2012   Fee ......................... H02K 11/40
                                                                   310/90

(Continued)

FOREIGN PATENT DOCUMENTS

CN          208128076 U      11/2018
CN          109790914 A       5/2019

(Continued)

OTHER PUBLICATIONS

CN 109038951 A—Translation (Year: 2025).*
18455288_2025-08-12_CN_112117858_A_H.pdf (Year: 2025).*

*Primary Examiner* — Maged M Almawri
*Assistant Examiner* — Ahmed F Seck
(74) *Attorney, Agent, or Firm* — Conley Rose, P.C.

(57) ABSTRACT

A power assembly includes a power component and a shell. The shell includes an accommodating structure, a flow diversion structure, a liquid storage structure, a heat dissipation structure, and a heat exchange structure. The accommodating structure is filled with cooling liquid. The flow diversion structure is configured to guide a flow direction of the cooling liquid. The liquid storage structure is configured to store the cooling liquid that is guided by the flow diversion structure to enter the liquid storage structure, and to distribute the cooling liquid that enters the liquid storage structure. The heat dissipation structure is configured to receive the cooling liquid distributed by the liquid storage structure, and to transfer the cooling liquid to the power component to cool the power component. The heat exchange structure is configured to perform heat exchange and cooling on the cooling liquid in the accommodating structure.

20 Claims, 8 Drawing Sheets

(56)         References Cited

U.S. PATENT DOCUMENTS

| | | | | |
|---|---|---|---|---|
| 2009/0243443 A1* | 10/2009 | Aoki | ...................... | H02K 11/05 |
| | | | | 310/68 D |
| 2011/0012448 A1* | 1/2011 | Tanaka | .................... | H02K 9/19 |
| | | | | 310/54 |
| 2012/0181848 A1* | 7/2012 | Makino | .................... | H02K 7/14 |
| | | | | 301/6.5 |
| 2016/0204679 A1* | 7/2016 | Yamada | ................... | H02K 7/08 |
| | | | | 310/45 |
| 2018/0083509 A1* | 3/2018 | Yang | .................. | H01M 10/625 |

FOREIGN PATENT DOCUMENTS

| | | | | | |
|---|---|---|---|---|---|
| CN | 109038951 A | * | 4/2020 | .............. | B60K 1/00 |
| CN | 111416458 A | | 7/2020 | | |
| CN | 112092607 A | | 12/2020 | | |
| CN | 112117858 A | * | 12/2020 | .............. | H02K 5/18 |
| JP | 2009103032 A | | 5/2009 | | |

* cited by examiner

POWER ASSEMBLY AND ELECTRIC VEHICLE

CROSS-REFERENCE TO RELATED APPLICATIONS

This application is a continuation application of International Patent Application No. PCT/CN2021/078274, filed on Feb. 26, 2021, which is hereby incorporated by reference in its entirety.

TECHNICAL FIELD

This application relates to the technical field of electric vehicles, and in particular, to a power assembly and an electric vehicle.

BACKGROUND

Different from a conventional oil-fueled automotive in which energy produced by combustion of fuel oil is used to drive an engine to make the fuel-fueled automotive move, a power source of an electric vehicle is a battery, and a power assembly including a motor is usually used to drive the electric vehicle. The motor in the power assembly of the electric vehicle is a power output core of the electric vehicle, and ensuring normal and stable operation of the motor is a key point of motor design. A heat loss of the motor during the operation includes a copper wire loss, an iron core loss, a windage loss, a stray loss, a mechanical loss, and the like. Generally, there are the following three modes for cooling a motor of an electric vehicle such as air cooling, water cooling, and oil cooling.

An air cooling system uses wind generated by vehicle movement as a cooling medium, and a heat transfer path involves heat conduction between a motor and a motor shell and forced convection heat dissipation between the motor shell and air. Because the heat transfer path is long and a convection heat dissipation capability of the air is weak, the air cooling system is usually used only for a motor with relatively low heat productivity.

A water cooling system uses a vehicle coolant as a cooling medium, and a heat transfer path involves heat conduction between a motor and a water-cooled jacket and forced convection heat dissipation between the water-cooled jacket and the coolant. Compared with the air, the coolant has a stronger forced convection heat dissipation capability. Therefore, an overall heat dissipation capability of the water cooling system is also stronger. However, because there is also additional thermal resistance of heat conduction, the water cooling system usually needs a relatively large heat exchange area. In the current modes for cooling a motor of an electric vehicle, the water cooling system is most widely applied.

An oil cooling system uses a special insulating coolant or directly uses specially modulated transmission oil as a coolant, and a heat transfer path involves forced convection heat dissipation between a motor and cooling oil. Compared with the foregoing two cooling systems, due to direct contact between the coolant and a heat source, the oil cooling system has a strongest cooling capacity, can achieve more optimal performance through design, and can be used in a higher power density scenario.

Usually, an oil-cooled electric drive system architecture mainly includes the following components such as an electric oil pump, a heat exchanger, and cooling structures in a stator and a rotor of a motor. The electric oil pump is configured to provide power for circulation of cooling oil. The heat exchanger is configured to dissipate heat from the system. The cooling structures designed in the stator and the rotor of the motor determine a heat exchange mode between the cooling oil and a heat source. A drive motor of an electric vehicle is developing in a direction of miniaturization, high speed, and low cost. For an electric drive assembly with small and medium power, the water cooling system cannot meet a heat dissipation requirement caused by increasing power density of a motor. However, because an electric oil pump and a heat exchanger are disposed, a conventional oil cooling system has relatively high costs and has no price advantage.

SUMMARY

In view of this, it is necessary to provide a power assembly and an electric vehicle, to effectively improve heat dissipation efficiency and reduce costs.

According to a first aspect of embodiments of this application, a power assembly is provided, including a shell and a power component disposed in the shell. The shell includes an accommodating structure, a flow diversion structure, a liquid storage structure, a heat dissipation structure, and a heat exchange structure. The accommodating structure is filled with cooling liquid, and the power component is rotatably disposed in the accommodating structure, and can drive the cooling liquid in the accommodating structure to flow during rotation. The flow diversion structure is configured to guide a flow direction of the cooling liquid that is driven by the power component to flow. The liquid storage structure is configured to store the cooling liquid that is guided by the flow diversion structure to enter the liquid storage structure, and distribute the cooling liquid that enters the liquid storage structure. The heat dissipation structure is communicated with both the liquid storage structure and the accommodating structure, and the heat dissipation structure is configured to receive the cooling liquid distributed by the liquid storage structure, and transfer the cooling liquid to the power component to cool the power component. The heat exchange structure is configured to perform heat exchange and cooling on the cooling liquid in the accommodating structure.

The heat dissipation structure, the liquid storage structure, the flow diversion structure, and the heat exchange structure are formed in the shell, so that the power assembly can directly drive the cooling liquid to flow and undergo heat exchange without an additional electric oil pump and external heat exchanger. In this way, costs of the oil pump and the heat exchanger are saved, an advantage of heat dissipation of an oil cooling system is obtained, and costs are reduced.

In a possible design of the first aspect, the shell includes a motor shell and a reducer shell, the motor shell and the reducer shell are connected to each other, a rotating shaft cavity is disposed in the motor shell, a gear cavity is disposed in the reducer shell, and the rotating shaft cavity and the gear cavity are communicated with each other and jointly form the accommodating structure.

In a possible design of the first aspect, the heat dissipation structure includes a stator heat dissipation groove, a spacer plate is disposed on the top of the rotating shaft cavity, the spacer plate and the motor shell define the stator heat dissipation groove, a liquid guiding hole is disposed in the spacer plate, and the liquid guiding hole is communicated with the stator heat dissipation groove and the rotating shaft cavity. The spacer plate is disposed on the rotating shaft cavity, so that the stator heat dissipation groove is formed on the motor shell, and the hole is opened in the spacer plate, so that heat dissipation can be performed for a stator.

In a possible design of the first aspect, the spacer plate and the motor shell are integrated. The integration design can improve structure compactness and stability.

In a possible design of the first aspect, a liquid storage plate is disposed on the top of the gear cavity, the liquid storage plate and the reducer shell define the liquid storage structure, and the liquid storage structure is communicated with the stator heat dissipation groove. By disposing the liquid storage plate on the gear cavity, the liquid storage structure is formed on the reducer shell to store the cooling liquid raised in the gear cavity.

In a possible design of the first aspect, the liquid storage plate and the reducer shell are integrated. The integration design can improve structure compactness and stability.

In a possible design of the first aspect, the flow diversion structure is further disposed in the gear cavity, a liquid inlet hole is disposed between a side of the liquid storage plate close to the flow diversion structure and the reducer shell, and the liquid inlet hole is communicated with the liquid storage structure and the gear cavity. The design of the flow diversion structure in the gear cavity and the liquid inlet hole opened close to the flow diversion structure can facilitate entry of the cooling liquid from the gear cavity to the liquid storage structure under the guidance of the flow diversion structure.

In a possible design of the first aspect, the flow diversion structure and the reducer shell are integrated. The integration design can improve structure compactness and stability.

In a possible design of the first aspect, the heat exchange structure includes a heat exchange cavity, a cooling cavity, a water inlet pipe, and a water outlet pipe, the heat exchange cavity communicated with the accommodating structure is disposed at the bottom of the accommodating structure, the cooling cavity is formed at the bottom of the shell, the cooling cavity surrounds the shell forming the heat exchange cavity, both the water inlet pipe and the water outlet pipe are communicated with the cooling cavity, the water inlet pipe is configured to allow inflow of cooling water, and the water outlet pipe is configured to allow outflow of the cooling water. By disposing the heat exchange structure provided with the heat exchange cavity, the cooling cavity, the water inlet pipe, and the water outlet pipe, the cooling liquid in the shell can be cooled through water cooling, improving cooling efficiency.

In a possible design of the first aspect, the heat exchange structure includes cooling fins, the cooling fins are disposed in the cooling cavity, and the cooling fins are configured to form, in the cooling cavity, a flow channel for allowing flow of the cooling water. The cooling fins can improve heat exchange performance of the cooling cavity.

In a possible design of the first aspect, the heat exchange structure includes cooling fins, and the cooling fins are formed at the bottom of the shell. The cooling fins are configured to perform heat exchange on the cooling liquid in the shell through air cooling.

In a possible design of the first aspect, the power component includes a stator, a rotor, an input shaft, an intermediate gear, and an output shaft gear, the stator is disposed in the rotating shaft cavity, the rotor is rotatably disposed in the stator, the input shaft is disposed on the rotor and the input shaft and the rotor are coaxially disposed, the input shaft is rotatably disposed in the reducer shell, an input shaft gear is disposed at one end that is of the input shaft and that is disposed in the reducer shell, the intermediate gear and the output shaft gear are disposed in the gear cavity, the intermediate gear includes an input gear and an output gear that are coaxially disposed, the input gear and the input shaft gear are engaged with each other, the output gear and the output shaft gear are engaged with each other, and the flow diversion structure is configured to guide the cooling liquid raised by the intermediate gear or the output shaft gear, to enter the liquid storage structure.

In a possible design of the first aspect, the heat dissipation structure includes a rotor heat dissipation groove, a mounting part is disposed in the gear cavity, the input shaft is rotatably disposed on the mounting part, a liquid guiding hole is disposed in the mounting part, the rotor heat dissipation groove is disposed in the reducer shell, one end of the rotor heat dissipation groove is communicated with the liquid storage structure, the other end thereof is communicated with the liquid guiding hole, the input shaft is axially provided with a mounting hole and a heat dissipation cavity, and the mounting part is disposed in the mounting hole. By disposing the liquid guiding hole, the rotor heat dissipation groove, the mounting hole, and the heat dissipation cavity, the cooling liquid can flow into the heat dissipation cavity to dissipate heat for the input shaft, and flow to the rotor to dissipate heat for the rotor.

In a possible design of the first aspect, the rotor heat dissipation groove is defined by a plate structure that is integrated with the reducer shell. The integration design can improve structure compactness and stability.

In a possible design of the first aspect, the rotor heat dissipation groove is formed by a part disposed in the reducer shell. According to the separate part design, a flow rate of the cooling liquid for cooling the rotor can be adjusted by adjusting a size of the rotor heat dissipation groove, to adjust cooling efficiency.

According to a second aspect of embodiments of this application, an electric vehicle is provided, including a power assembly, a battery, and wheels. The power assembly is the power assembly according to the first aspect and any possible design of the first aspect, the battery provides electric energy for the power assembly, and the wheels are connected to the power assembly. The electric vehicle provided in this embodiment of the present disclosure has same technical effects as the power assembly provided in the foregoing embodiment, and details are not described herein again. In addition, a cost requirement of the electric vehicle is satisfied.

Figure 1:
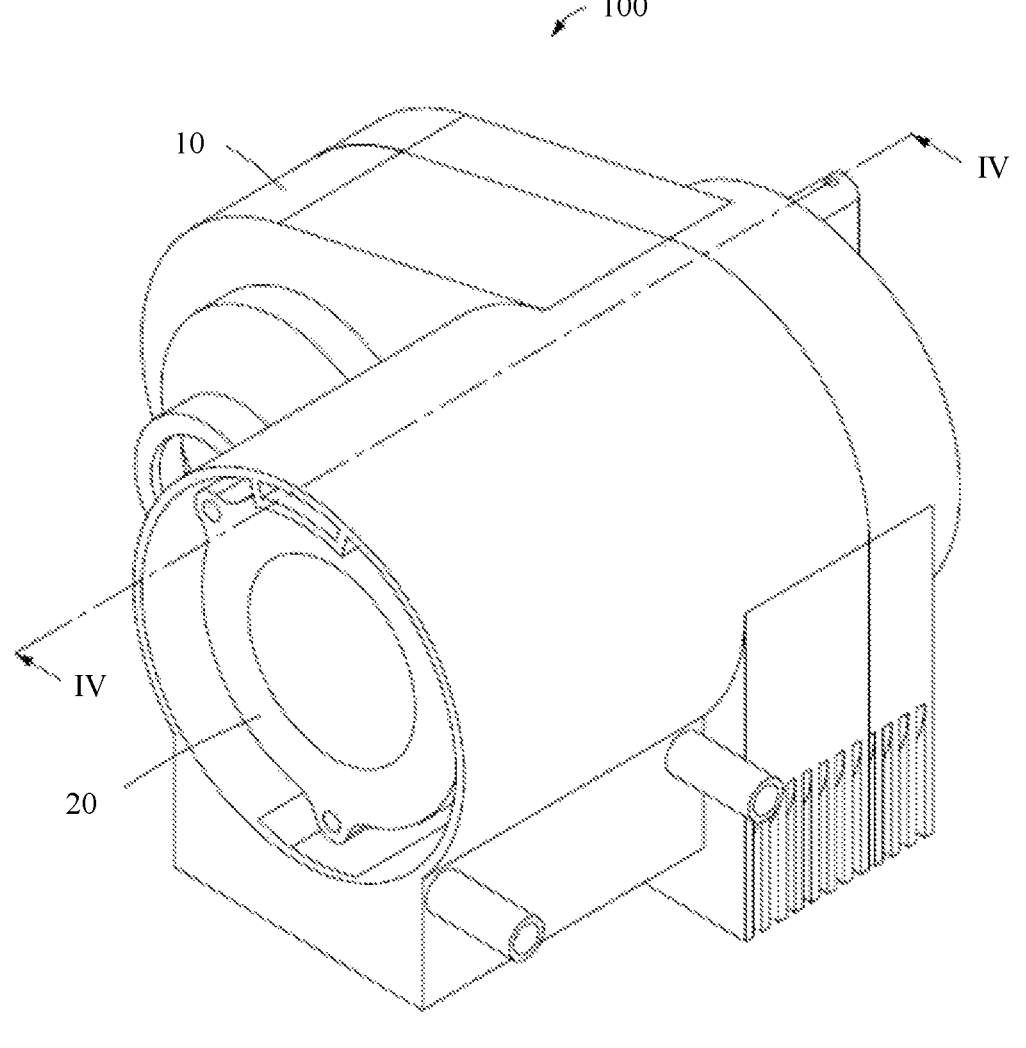
FIG. 1 is a schematic diagram of a power assembly according to Embodiment 1 of this application.

| Sign description of main components | |
|---|---|
| Power assemblies | 100 and 200 |
| Shell | 10 |
| Accommodating structure | 101 |
| Heat dissipation structure | 102 |
| Stator heat dissipation groove | 1021 |
| Rotor heat dissipation groove | 1022 |
| Liquid storage structure | 103 |
| Flow diversion structure | 104 |
| Heat exchange structure | 105 |
| Motor shell | 11 |
| Rotating shaft cavity | 111 |
| Spacer plate | 112 |
| Liquid guiding hole | 113 |
| Heat exchange cavity | 114 |
| Cooling cavity | 115 |
| Cooling fins | 116 and 124 |
| Water inlet pipe | 117 |
| Water outlet pipe | 118 |
| Reducer shell | 12 |
| Gear cavity | 121 |
| Liquid storage plate | 122 |
| Liquid inlet hole | 123 |
| Output hole | 125 |
| Mounting part | 126 |
| Liquid guiding hole | 127 |
| Power component | 20 |
| Stator | 21 |
| Input shaft | 22 |
| Input shaft gear | 221 |
| Mounting hole | 222 |
| Heat dissipation cavity | 223 |
| Intermediate gear | 23 |
| Input gear | 231 |
| Output gear | 232 |
| Output shaft gear | 24 |
| Mounting hole | 241 |

The present disclosure is further described in the following implementations with reference to the accompanying drawings.

DESCRIPTION OF EMBODIMENTS

The following describes the technical solutions in embodiments of the present disclosure with reference to accompanying drawings in embodiments of the present disclosure. In examples, the described embodiments are merely a part rather than all of embodiments of the present disclosure.

Unless otherwise defined, all technical and scientific terms used in this specification have the same meaning as those commonly understood by persons skilled in the technical field of the present disclosure. The terms used in this specification of the present disclosure are merely for the purpose of describing embodiments, and are not intended to limit the present disclosure.

Terms such as "first" and "second" mentioned below are merely intended for a purpose of description, and shall not be understood as an indication or implication of relative importance or implicit indication of a quantity of indicated technical features. Therefore, a feature limited by "first", "second" and the like may explicitly indicate or implicitly include one or more such features. In the descriptions of this application, unless otherwise stated, "a plurality of" means two or more than two. Orientation terms such as "above", "below", "left", and "right" are defined relative to an orientation of schematic placement of components in the accompanying drawings. It should be understood that these directional terms are relative concepts and are used for relative description and clarification. These directional terms may vary accordingly depending on an orientation in which the components are placed in the accompanying drawings.

In this application, unless otherwise specified and limited, the term "connection" should be understood in a broad sense. For example, the "connection" may be a fixed connection, a detachable connection, an integration, a direct connection, or an indirect connection implemented by using an intermediate medium. The term "and/or" used in this specification includes any and all combinations of one or more related listed items.

During detailed description of the following embodiments with reference to schematic diagrams, for ease of description, a diagram indicating a partial structure of a device is not partially enlarged according to a general proportion, and the schematic diagram is merely an example, and shall not limit the protection scope of the present disclosure herein.

Embodiment 1

FIG. 1 is a schematic diagram of a structure of a power assembly 100 according to Embodiment 1 of the present disclosure. The power assembly 100 includes a shell 10 and a power component 20. The power component 20 is disposed in the shell 10.

Figure 2:
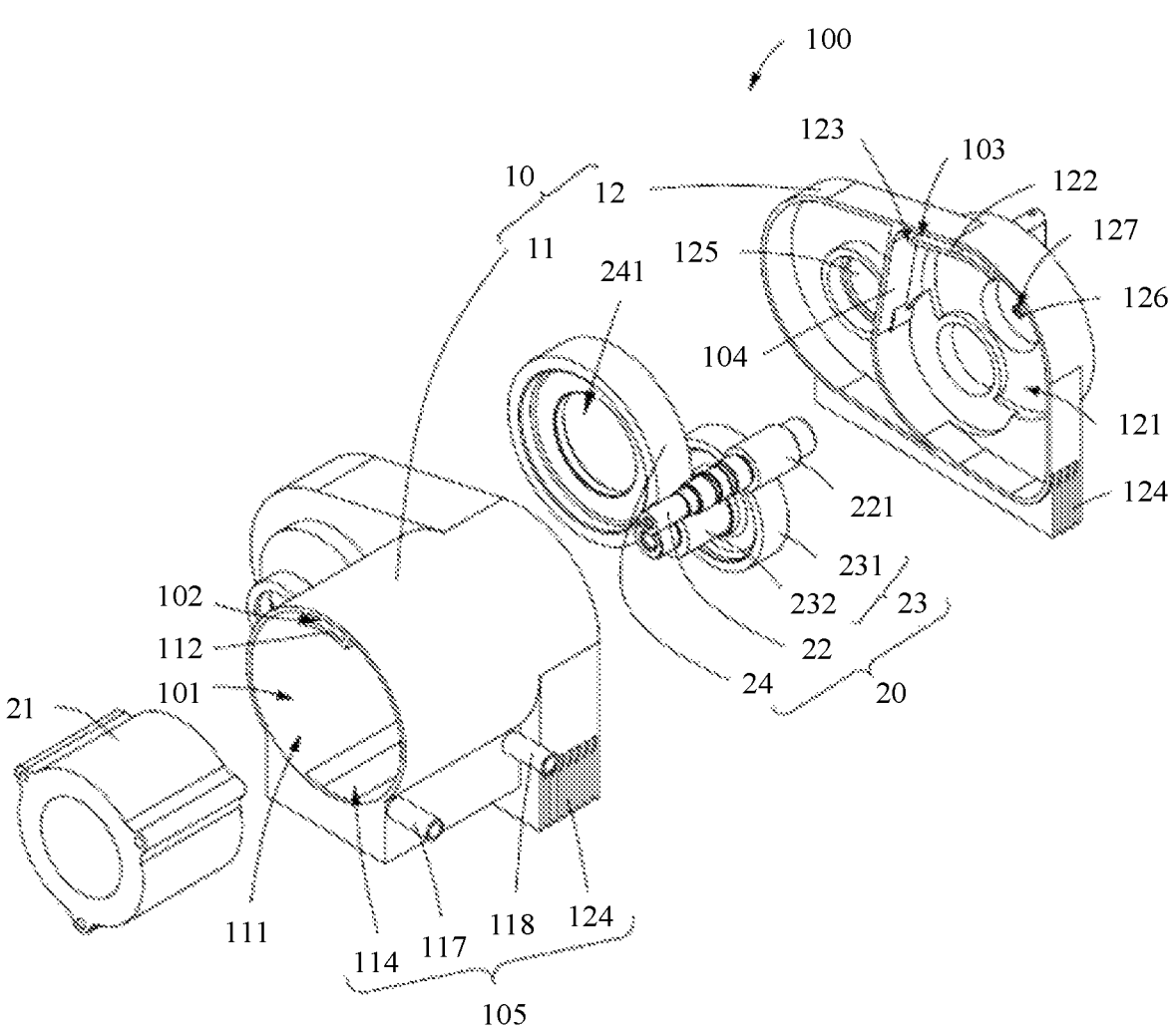
FIG. 2 is a schematic exploded diagram of a structure of the power assembly shown in FIG. 1.
Figure 3:
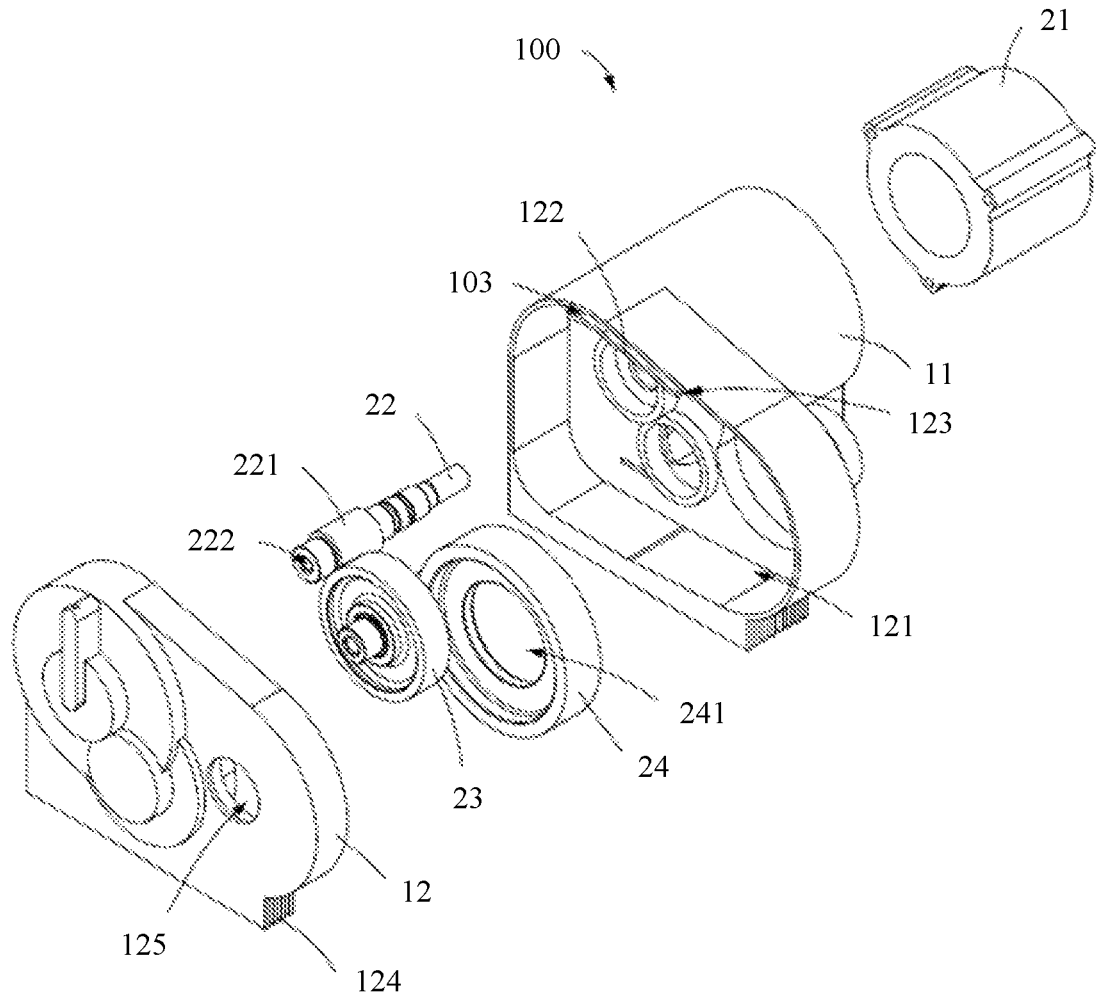
FIG. 3 is a schematic exploded diagram of a structure that is presented at another angle and that is of the power assembly shown in FIG. 1.
Figure 4:
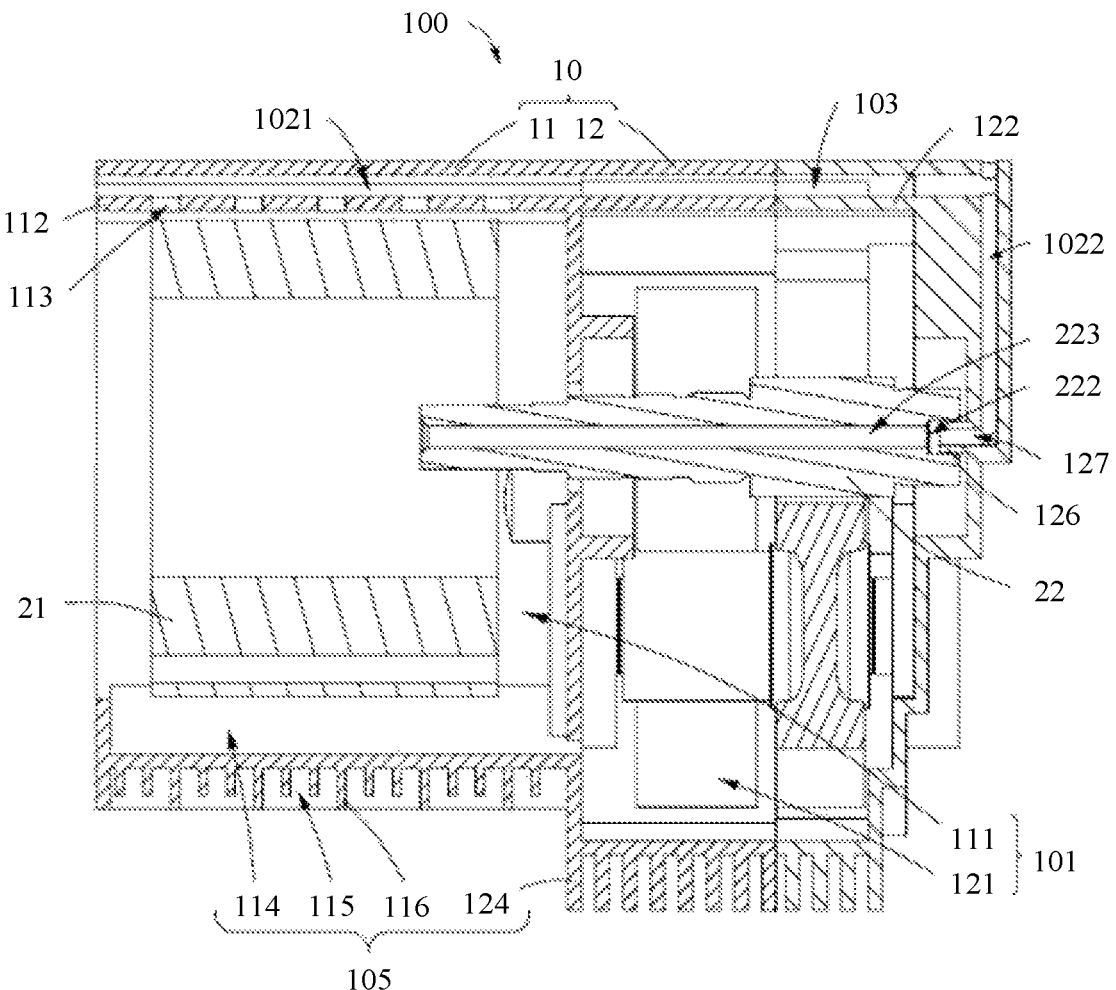
FIG. 4 is a cross-sectional view that is along IV-IV and that is of the power assembly shown in FIG. 1.

Referring to FIG. 2 to FIG. 4, an accommodating structure 101, a heat dissipation structure 102, a liquid storage structure 103, a flow diversion structure 104, and a heat exchange structure 105 are formed in the shell 10. The accommodating structure 101 is filled with cooling liquid. The power component 20 is rotatably disposed in the accommodating structure 101 in the shell 10, and can drive the cooling liquid in the accommodating structure 101 to flow during rotation, to raise the cooling liquid in the accommodating structure 101. The flow diversion structure 104 is configured to guide a flow direction of the cooling liquid that is driven by the power component 20 to flow, so that the raised cooling liquid enters the liquid storage structure 103. The liquid storage structure 103 is configured to store and distribute the cooling liquid that enters the liquid storage structure 103. The heat dissipation structure 102 is communicated with both the liquid storage structure 103 and the accommodating structure 101. The heat dissipation structure 102 is configured to receive the cooling liquid distributed by the liquid storage structure 103, and transfer the cooling liquid to the power component 20 to cool the power component 20. The heat exchange structure 105 is configured to perform heat exchange on the cooling liquid that enters the heat exchange structure 105, so that the cooling liquid in the shell 10 is cooled, and heat generated by the power assembly 100 is dissipated from the power assembly 100.

The shell 10 includes a motor shell 11 and a reducer shell 12. The motor shell 11 and the reducer shell 12 are connected to each other. A rotating shaft cavity 111 is disposed in the motor shell 11. A gear cavity 121 is disposed in the reducer shell 12. The rotating shaft cavity 111 and the gear cavity 121 are communicated with each other and jointly form the accommodating structure 101 configured to fill the cooling liquid.

The power component 20 includes a stator 21, a rotor (not shown in the figure), an input shaft 22, an intermediate gear 23, and an output shaft gear 24. The stator 21 is disposed in the rotating shaft cavity 111. The rotor is rotatably disposed in the stator 21. The input shaft 22 is disposed on the rotor and the input shaft 22 and the rotor are coaxially disposed. The input shaft 22 is rotatably disposed in the reducer shell 12. One end of the input shaft 22 passes through the motor shell 11, and is disposed on the rotor. An input shaft gear 221 is disposed at the other end that is of the input shaft 22 and that is disposed in the reducer shell 12. The intermediate gear 23 and the output shaft gear 24 are disposed in the gear cavity 121. The intermediate gear 23 includes an input gear 231 and an output gear 232 that are coaxially disposed. The input gear 231 and the input shaft gear 221 are engaged with each other. The output gear 232 and the output shaft gear 24 are engaged with each other. An output hole 125 is further disposed in the reducer shell 12. An axis of the output shaft gear 24 coincides with an axis of the output hole 125, and a mounting hole 241 for connecting to an output shaft (not shown in the figure) is disposed in the output shaft gear 24, to output, by connecting to the external output shaft, power generated by the power assembly 100.

The heat dissipation structure 102 includes a stator heat dissipation groove 1021 configured to dissipate heat for the stator 21. A spacer plate 112 is formed on the top of the rotating shaft cavity 111. The spacer plate 112 and a top part of the motor shell 11 define the stator heat dissipation groove 1021. A plurality of liquid guiding holes 113 are opened in the spacer plate 112. The liquid guiding hole 113 is communicated with the stator heat dissipation groove 1021 and the rotating shaft cavity 111. The stator 21 includes a stator iron core and a coil. The stator heat dissipation groove 1021 transfers the cooling liquid to the stator iron core and the coil through the liquid guiding holes 113. For example, the cooling liquid is made to be in contact with the stator 21 in a spraying manner, to dissipate heat for the stator 21.

A liquid storage plate 122 is formed on the top of the gear cavity 121. The liquid storage plate 122 and a top part of the reducer shell 12 define the liquid storage structure 103. The liquid storage structure 103 is communicated with the stator heat dissipation groove 1021.

The flow diversion structure 104 is further formed in the gear cavity 121. The flow diversion structure 104 may be a diversion plate, a diversion groove, a diversion hole, or the like. An opening exists between one side of the liquid storage plate 122 close to the flow diversion structure 104 and the top part of the reducer shell 12 to form a liquid inlet hole 123. The liquid inlet hole 123 is communicated with the liquid storage structure 103 and the gear cavity 121. The flow diversion structure 104 in the gear cavity 121 and the liquid inlet hole 123 opened close to the flow diversion structure 104 can facilitate entry of the cooling liquid from the gear cavity 121 to the liquid storage structure 103 under the guidance of the flow diversion structure 104.

The heat exchange structure 105 is located at the bottom of the accommodating structure 101. The heat exchange structure 105 includes a heat exchange cavity 114, a cooling cavity 115, cooling fins 116, a water inlet pipe 117, and a water outlet pipe 118. The heat exchange cavity 114 is disposed at the bottom of the rotating shaft cavity 111. The heat exchange cavity 114 is directly communicated with the rotating shaft cavity 111. The cooling cavity 115 is formed at the bottom of the motor shell 11. The cooling cavity 115 surrounds the motor shell 11 forming the heat exchange cavity 114. The cooling fins 116 are disposed in the cooling cavity 115. Both the water inlet pipe 117 and the water outlet pipe 118 are communicated with the cooling cavity 115. The heat exchange cavity 114 is configured to allow the cooling liquid in the rotating shaft cavity 111 to enter the heat exchange structure 105, to perform heat exchange and cooling on the cooling liquid by using the heat exchange structure 105. The cooling cavity 115 is configured to circulate external cooling water to perform heat exchange on the cooling liquid in the heat exchange cavity 114 through water cooling. The cooling fins 116 can form, in the cooling cavity 115, a flow channel for allowing flow of the cooling water, and the cooling fins 116 are configured to improve heat exchange performance of the cooling cavity 115. The water inlet pipe 117 and the water outlet pipe 118 are respectively configured to connect to cooling water pipes to allow inflow and outflow of the cooling water.

The heat exchange structure 105 further includes cooling fins 124. The cooling fins 124 are formed at the bottom of the reducer shell 12. The cooling fins 124 are configured to perform heat exchange on the cooling liquid in the gear cavity 121 through air cooling.

The heat dissipation structure 102 further includes a rotor heat dissipation groove 1022 configured to dissipate heat for a rotor of a motor and the input shaft 22. The rotor includes a rotor core, magnetic steel, a rotating shaft, and an end cover. A mounting part 126 is disposed in the gear cavity 121. The input shaft 22 is rotatably disposed on the mounting part 126. The mounting part 126 is provided with a liquid guiding hole 127. The rotor heat dissipation groove 1022 is formed in the reducer shell 12. One end of the rotor heat dissipation groove 1022 is communicated with the liquid storage structure 103, and the other end thereof is communicated with the liquid guiding hole 127. The input shaft 22 is provided with a mounting hole 222 and a heat dissipation cavity 223 along an axial direction. The mounting part 126 is disposed in the mounting hole 222. The cooling liquid flows into the heat dissipation cavity 223 through the liquid storage structure 103, the rotor heat dissipation groove 1022, the liquid guiding hole 127, and the mounting hole 222 to dissipate heat for the input shaft 22, and flows to the rotor to dissipate heat for the rotor. If a through hole is disposed in an axial direction of a rotating shaft of the rotor, the rotating shaft may be cooled through liquid introduction. If a nozzle hole is disposed in a radial direction of the rotating shaft, the rotor core, the magnetic steel, the end cover, and the like may be cooled by spraying liquid.

The spacer plate 112 extends along axial directions of the rotor and the input shaft 22, and the liquid guiding holes 113 are evenly disposed on the spacer plate 112 along the axial directions of the rotor and the input shaft 22. The cooling liquid enters the stator heat dissipation groove 1021 through the liquid storage structure 103, and flows into the rotating shaft cavity 111 from the top through the liquid guiding hole 113, to evenly flow to the stator 21 to dissipate heat for the stator 21.

The flow diversion structure 104 is formed on a wall surface of the gear cavity 121 away from the motor shell 11. The flow diversion structure 104 is disposed in the gear cavity 121 along a periphery of the input gear 231, one side of the flow diversion structure 104 close to the liquid storage structure 103 is disposed on the top of the gear cavity 121, and the other side thereof is connected to a wall surface at the bottom of the gear cavity 121. When the rotor drives the input shaft 22 to rotate and drives the input gear 231 to rotate, the flow diversion structure 104 cooperates with the input gear 231 of the intermediate gear 23, and the cooling liquid in the gear cavity 121 is guided to the liquid storage structure 103 through the liquid inlet hole 123.

In this embodiment, the spacer plate 112 and the motor shell 11 are integrated, so that the stator heat dissipation groove 1021 is formed on the top of the motor shell 11. The liquid storage plate 122 and the reducer shell 12 are integrated, so that the liquid storage structure 103 is formed on the top of the reducer shell 12. The flow diversion structure 104 and the reducer shell 12 are integrated. The rotor heat dissipation groove 1022 is a groove-shaped structure defined by a plate structure formed in the reducer shell 12. The integration design can be used to improve structure compactness and stability Before use, the cooling liquid is filled in a lower half part of the accommodating structure 101. During working, when the power assembly 100 operates at a low speed, the rotor of the power component 20 generates a relatively small amount of heat, and the heat mainly comes from the stator 21. In this case, because raising force of the power component 20 is insufficient, a liquid surface of the cooling liquid basically remains near a static liquid surface, the cooling liquid immerses the stator core and a coil winding in a lower half of the stator 21, and the heat generated by the stator 21 is directly transferred to the cooling liquid. Because a rotational speed is relatively low in this case, even if the liquid surface of the cooling liquid is in contact with some gears of the power component 20, a loss of a large amount of mechanical energy is not caused. The heat exchange structure 105 at the bottom of the accommodating structure 101 cools the cooling liquid in the accommodating structure 101. When the power assembly 100 operates at a high speed, the rotor of the power component 20 generates a large amount of heat. In addition, due to high-speed operation, more cooling liquid is raised by the power component 20 to the liquid storage structure 103, so that more cooling liquid is stored in the liquid storage structure 103, and a liquid level of the cooling liquid in the accommodating structure 101 decreases sharply. Therefore, a contact area between a gear in the reducer shell 12 and the cooling liquid is reduced, and a mechanical energy loss caused by contact with the liquid surface is reduced. In this case, the cooling liquid raised to the liquid storage structure 103 is distributed to the stator heat dissipation groove 1021 and the rotor heat dissipation groove 1022, and the cooling liquid is respectively transferred to the stator 21 and the rotor through the liquid guiding hole 113 and the liquid guiding hole 127, to cool the stator 21 and the rotor of the power component 20. The heat exchange structure 105 at the bottom of the accommodating structure 101 cools the cooling liquid in the accommodating structure 101.

The power assembly 100 provided in this embodiment of this application is in a power assembly system with medium and low power. The power assembly 100 has a higher cost advantage compared with an oil cooling system because a heat exchanger and an electric oil pump are not disposed, and has a higher cooling advantage compared with water cooling and air cooling because the cooling liquid is used for cooling. The cooling liquid is collected and raised to the liquid storage structure 103 by using the power component 20. This reduces a dynamic liquid level, reduces an oil churning loss of a reducer, and improves output efficiency of the reducer. In addition, an amount of the cooling liquid used for cooling the stator 21 and the rotor is directly proportional to a rotational speed of a gear of the power component 20. In other words, a higher rotational speed indicates more cooling liquid in the liquid storage structure 103 and more cooling liquid in the heat dissipation structure 102 used for cooling the power component 20. This helps cool the stator 21 and the rotor at a high rotational speed.

According to the power assembly 100 provided in this embodiment of this application, the heat dissipation structure 102, the liquid storage structure 103, the flow diversion structure 104, and the heat exchange structure 105 are formed in the shell 10, so that the power assembly 100 can directly drive the cooling liquid to flow and undergo heat exchange without an additional electric oil pump and external heat exchanger. In this way, costs of the oil pump and the heat exchanger are saved, an advantage of heat dissipation of an oil cooling system is obtained, and costs are reduced.

Embodiment 2

Figure 5:
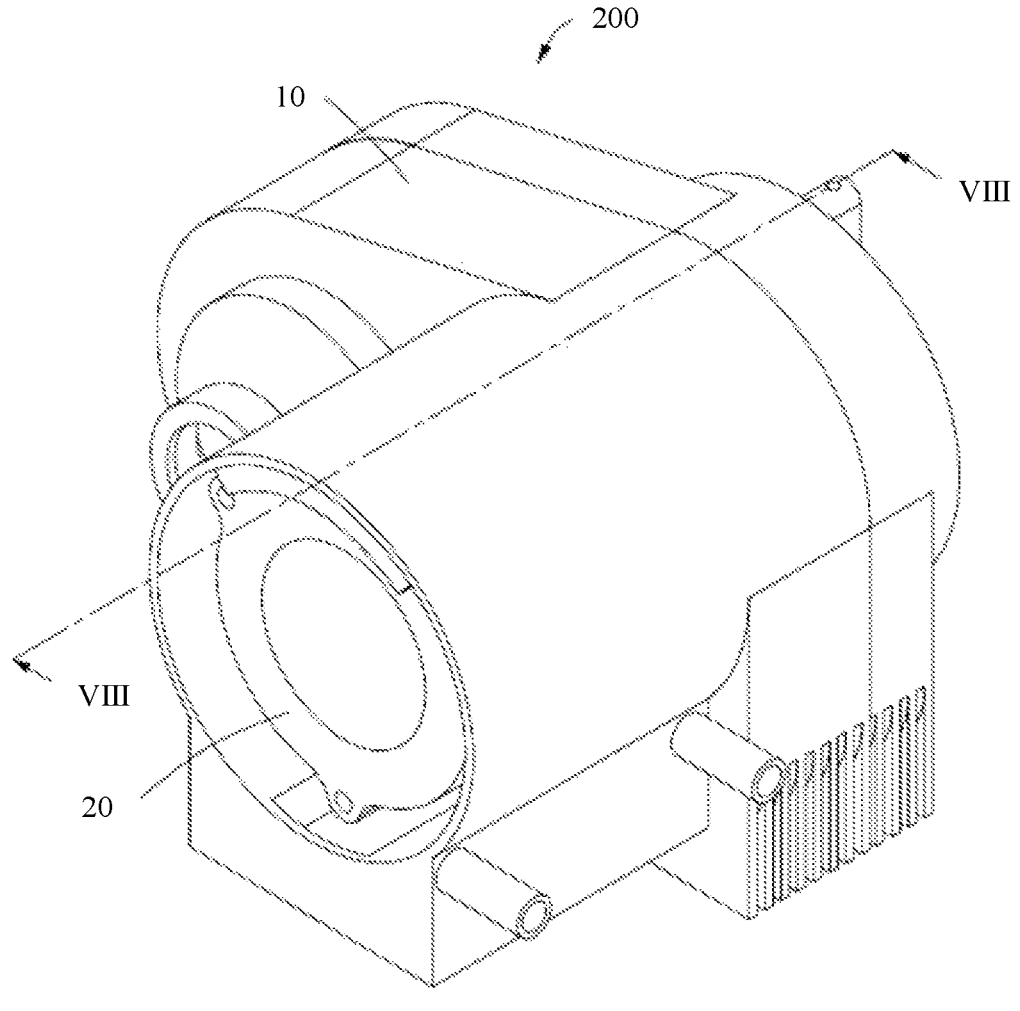
FIG. 5 is a schematic diagram of a power assembly according to Embodiment 2 of this application.

FIG. 5 is a schematic diagram of a structure of a power assembly 200 according to Embodiment 2 of the present disclosure.

The power assembly 200 is substantially the same as the power assembly 100. A main difference from the power assembly 100 in Embodiment 1 shown in FIG. 1 lies in that a heat dissipation structure 102 and a liquid storage structure 103 in the power assembly 200 are not integrated on a shell 10.

Figure 6:
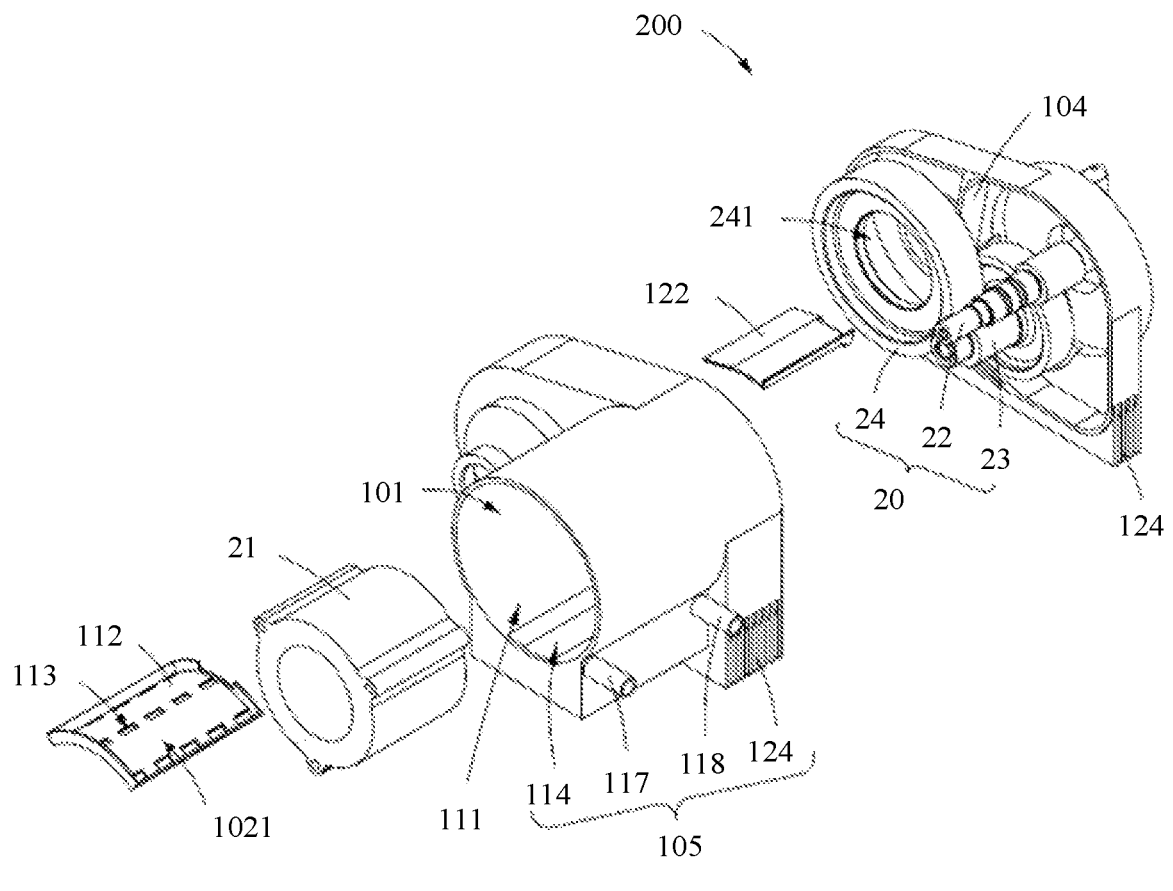
FIG. 6 is a schematic exploded diagram of a structure of the power assembly shown in FIG. 5.
Figure 7:
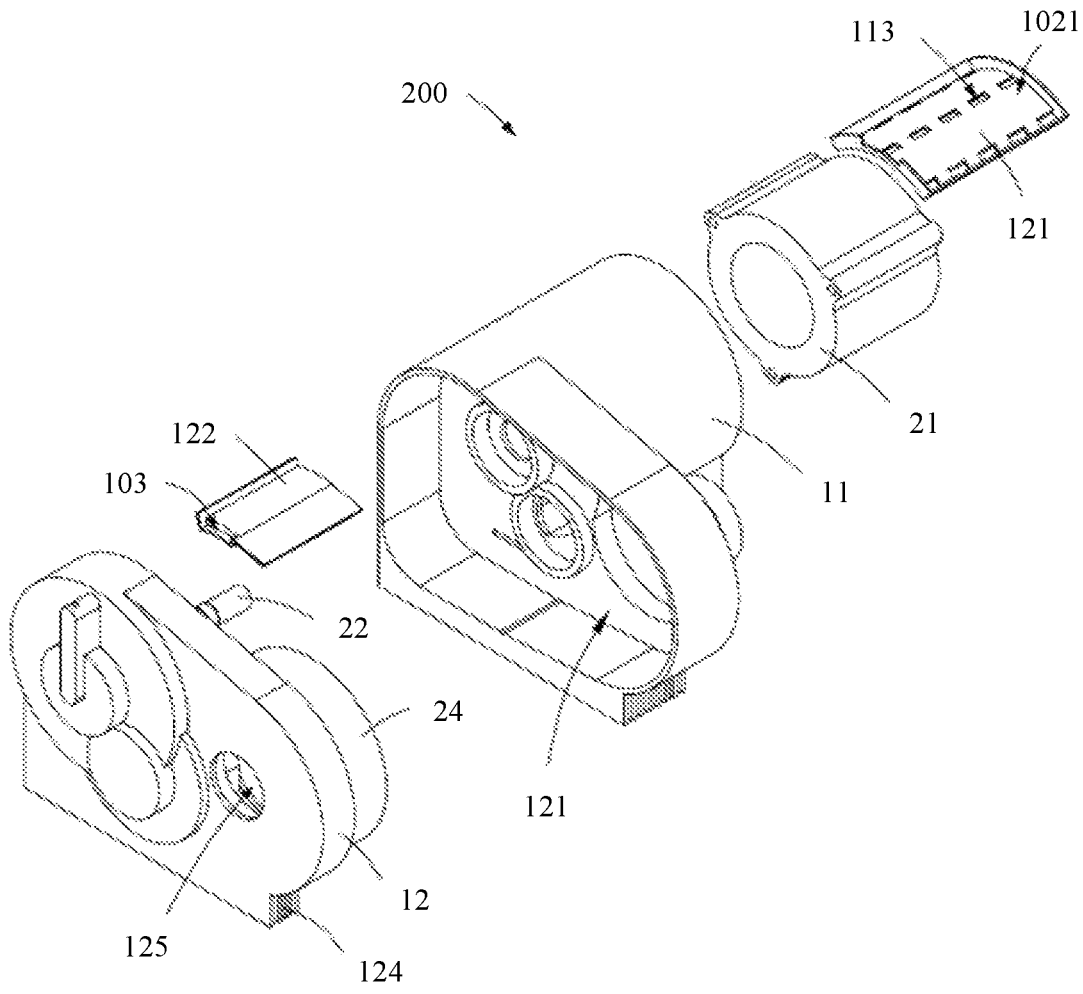
FIG. 7 is a schematic exploded diagram of a structure that is presented at another angle and that is of the power assembly shown in FIG. 5.
Figure 8:
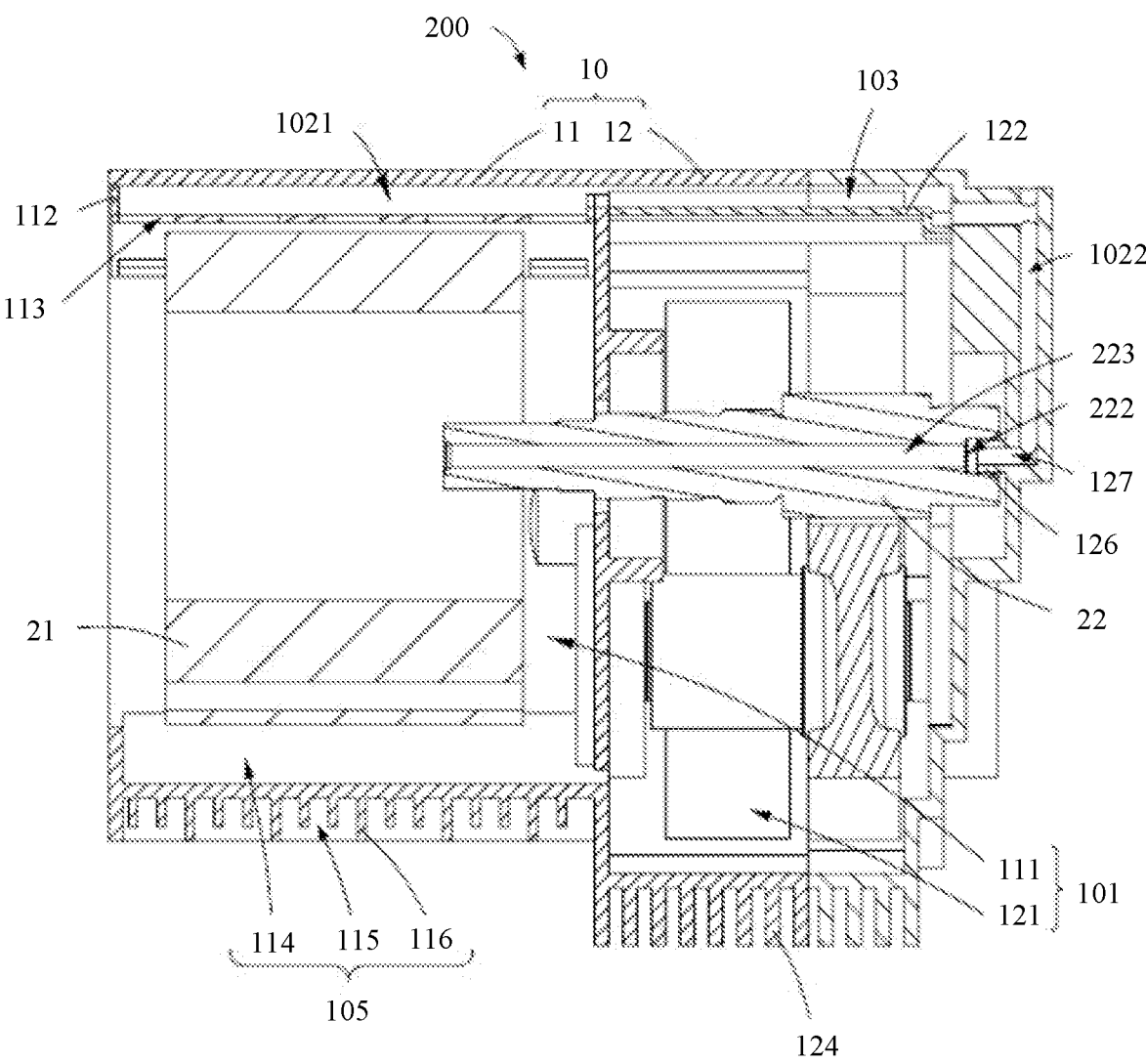
FIG. 8 is a cross-sectional view that is along VIII-VIII and that is of the power assembly shown in FIG. 5.

In an example, referring to FIG. 6 to FIG. 8, a spacer plate 112 independent of a motor shell 11 is disposed in a rotating shaft cavity 111. A stator heat dissipation groove 1021 that is in the heat dissipation structure 102 and that is configured to dissipate heat for a stator 21 is defined by the spacer plate 112 disposed on the top of the rotating shaft cavity 111 and a top part of the motor shell 11.

A liquid storage plate 122 independent of a reducer shell 12 is disposed in a gear cavity 121. The liquid storage structure 103 is defined by the liquid storage plate 122 disposed on the top of the gear cavity 121 and a top part of the reducer shell 12.

Three rows of liquid guiding holes 113 are provided in the spacer plate 112 along axial directions of a rotor and an input shaft 22, and a hole is opened on a side close to the reducer shell 12 to be communicated with the liquid storage structure 103. A side of the liquid storage plate 122 close to a flow diversion structure 104 is not connected to the top part of the reducer shell 12, to form a liquid inlet hole 123.

According to the power assembly 200 provided in this embodiment of this application, the spacer plate 112 and the liquid storage plate 122 are disposed in the shell 10 to form the heat dissipation structure 102 and the liquid storage structure 103 together with the shell 10, and the flow diversion structure 104 and a heat exchange structure 105 are formed in the shell 10, so that the power assembly 200 can directly drive cooling liquid to flow and undergo heat exchange without an additional electric oil pump and external heat exchanger. In this way, costs of the oil pump and the heat exchanger are saved, an advantage of heat dissipation of an oil cooling system is obtained, and costs are reduced. In addition, the spacer plate 112 and the liquid storage plate 122 that are separately disposed can be easily processed, and the spacer plate 112 and the liquid storage plate 122 may be adaptively adjusted according to a heat dissipation requirement, to facilitate improvement of production efficiency.

In an implementation of this application, the cooling liquid may be cooling oil, especially low-viscosity cooling oil. Alternatively, other cooling liquid suitable for a motor, especially for an electronic device, may be selected.

It may be understood that, in another embodiment, a manner of forming the heat dissipation structure 102 may be different from those in Embodiment 1 and Embodiment 2, provided that a function of the heat dissipation structure 102 can be implemented. A structure of the heat dissipation structure 102 may be a structure that is used for accommodating cooling liquid and that is similar to those in Embodiment 1 and Embodiment 2, and a hole for guiding the cooling liquid to flow out is disposed in the heat dissipation structure 102. Alternatively, the structure of the heat dissipation structure 102 may be a guiding structure for directly guiding the cooling liquid to flow out.

In an example, the stator heat dissipation groove 1021 may alternatively be a part separately disposed on the motor shell 11, or a groove-shaped structure defined by a part disposed in the rotating shaft cavity 111 and the stator 21, or a groove-shaped structure formed on the stator 21, or a groove-shaped structure defined by a plate structure formed in the rotating shaft cavity 111 and the stator 21, or a groove-shaped structure defined by a part disposed in the rotating shaft cavity 111, a plate structure formed in the rotating shaft cavity 111, and the stator 21.

Alternatively, a rotor heat dissipation groove 1022 may be formed by a part separately disposed on the reducer shell 12, or may be a groove-shaped structure defined by a part disposed on the reducer shell 12 and the reducer shell 12. The rotor heat dissipation groove 1022 may alternatively be a part that directly transfers cooling liquid to the rotor or another component disposed on the rotor. During separate part design or combined design, a size of the rotor heat dissipation groove 1022 may be adjusted according to a heat dissipation requirement, to adjust a flow rate of cooling liquid used for rotor cooling.

It may be understood that, in another embodiment, a manner of forming the liquid storage structure 103 may be different from those in Embodiment 1 and Embodiment 2, provided that a function of the liquid storage structure 103 can be implemented. A structure of the liquid storage structure 103 may be a structure that is used for accommodating cooling liquid and that is similar to those in Embodiment 1 and Embodiment 2, and a hole for guiding the cooling liquid to be distributed is disposed in the liquid storage structure 103. Alternatively, the structure of the liquid storage structure 103 may be a guiding structure for directly guiding the cooling liquid to flow in the heat dissipation structure 102. In an example, the liquid storage structure 103 may alternatively be a part separately disposed on the motor shell 11 or the reducer shell 12, or a groove-shaped structure defined by a part disposed in the shell 10 and the stator 21, or a groove-shaped structure defined by a plate structure formed in the shell 10 and the stator 21, or a groove-shaped structure formed on the stator 21, or a groove-shaped structure defined by a part disposed in the shell 10, a plate structure formed in the shell 10, and the stator 21.

It may be understood that, in another embodiment, the flow diversion structure 104 may not be limited to the foregoing form, provided that a function of the flow diversion structure 104 can be implemented. A structure of the flow diversion structure 104 may alternatively be disposed in the gear cavity 121 along a periphery of an output shaft gear 24, or may be directly a wall surface formed by the gear cavity 121 along the periphery of the output shaft gear 24. When the rotor drives the input shaft 22 to rotate and enables an intermediate gear 23 to drive the output shaft gear 24 to rotate, the flow diversion structure 104 cooperates with the output shaft gear 24, and the cooling liquid in the gear cavity 121 is guided to the liquid storage structure 103 through the liquid inlet hole 123.

Alternatively, the flow diversion structure 104 may be a part separately disposed on the reducer shell 12, or a guiding structure jointly formed by a part disposed in the reducer shell 12 and a plate formed in the reducer shell 12.

It may be understood that, in another embodiment, the heat exchange structure 105 may not be limited to the foregoing form, provided that a function of the heat exchange structure 105 can be implemented. For example, cooling fins 124 used for heat exchange through air cooling may be formed on the motor shell 11, and a heat exchange cavity 114, a cooling cavity 115, cooling fins 116, a water inlet pipe 117, and a water outlet pipe 118 that are used for heat exchange through water cooling may be formed on the reducer shell 12; or cooling fins 124 for heat exchange through air cooling may be formed on each of the motor shell 11 and the reducer shell 12, or a heat exchange cavity 114, a cooling cavity 115, cooling fins 116, a water inlet pipe 117, and a water outlet pipe 118 that are used for heat exchange through water cooling are formed on each of the motor shell 11 and the reducer shell 12.

An embodiment of this application further provides an electric vehicle.

The electric vehicle may be an electric apparatus such as a common electric vehicle/automobile (EV), a pure electric vehicle (PEV), a hybrid electric vehicle (HEV), a range extended EV (REEV), a plug-in hybrid EV (PHEV), a renewable vehicle, an electric bus, or an electric motorcycle.

The electric vehicle includes a battery, wheels, and a power assembly. The power assembly is the power assembly 100 or the power assembly 200 in the foregoing embodiments. The battery provides electric energy for the power assembly. A motor of the power assembly is connected to the wheels by using a reducer and an output shaft, to drive the wheels to rotate.

It should be understood that the electric vehicle provided in this embodiment further includes common electric vehicle components such as a vehicle body and a vehicle door. Details are not described herein.

The electric vehicle provided in this embodiment of the present disclosure has same technical effects as the power assembly provided in the foregoing embodiments. In addition, a cost requirement of the electric vehicle is satisfied.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A power assembly, comprising:

a power component comprising a stator disposed in a rotating shaft cavity and configured to drive cooling liquid to flow during rotation of the power component; and a shell comprising:

an accommodating structure filled with the cooling liquid and rotatably disposing the power component;

a flow diversion structure configured to guide a flow direction of the cooling liquid;

a liquid storage structure configured to:

receive the cooling liquid that is guided from the flow diversion structure;

store the cooling liquid; and distribute the cooling liquid;

a heat dissipation structure comprising:

a spacer plate disposed on a top of the rotating shaft cavity and comprising a liquid guiding hole; and a stator heat dissipation groove in communication with the liquid storage structure and the accommodating structure, wherein the stator heat dissipation groove is configured to:

receive the cooling liquid from the liquid storage structure; and transfer the cooling liquid to the stator through the liquid guiding hole for cooling the power component; and a heat exchange structure configured to:

perform heat exchange on the cooling liquid in the accommodating structure; and perform cooling on the cooling liquid in the accommodating structure.

2. The power assembly of claim 1, wherein the shell further comprises:

a motor shell comprising the rotating shaft cavity; and a reducer shell connected to the motor shell, wherein the reducer shell comprises a gear cavity, and wherein the rotating shaft cavity and the gear cavity are in communication with each other and jointly form the accommodating structure.

3. The power assembly of claim 2, wherein the spacer plate and the motor shell define the stator heat dissipation groove, and wherein the liquid guiding hole is in communication with the stator heat dissipation groove and the rotating shaft cavity.

4. The power assembly of claim 3, wherein the spacer plate and the motor shell are integrated with each other.

5. The power assembly of claim 3, wherein the shell further comprises a liquid storage plate that is disposed on a top of the gear cavity, wherein the liquid storage plate and the reducer shell define the liquid storage structure, and wherein the liquid storage structure is in communication with the stator heat dissipation groove.

6. The power assembly of claim 5, wherein the liquid storage plate and the reducer shell are integrated with each other.

7. The power assembly of claim 5, wherein the flow diversion structure is disposed in the gear cavity, wherein the liquid storage plate includes a liquid inlet hole disposed between a side of the liquid storage plate close to the flow diversion structure and the reducer shell, and wherein the liquid inlet hole is in communication with the liquid storage structure and the gear cavity.

8. The power assembly of claim 7, wherein the flow diversion structure and the reducer shell are integrated with each other.

9. The power assembly of claim 3, wherein the power component comprises:

a rotor rotatably disposed in the stator;

an input shaft comprising an end, wherein the input shaft is coaxially disposed on the rotor, and wherein the end is rotatably disposed in the reducer shell;

an intermediate gear disposed in the gear cavity, wherein the intermediate gear comprises:

an input gear; and an output gear, wherein the input gear and the output gear are coaxially disposed;

an output shaft gear disposed in the gear cavity; and an input shaft gear disposed at the end of the input shaft that is disposed in the reducer shell, wherein the input gear and the input shaft gear are engaged with each other, wherein the output gear and the output shaft gear are engaged with each other, and wherein the flow diversion structure is configured to guide the cooling liquid to enter the liquid storage structure when raised by the intermediate gear or the output shaft gear.

10. The power assembly of claim 1, wherein the heat exchange structure comprises:

a heat exchange cavity in communication with the accommodating structure and disposed at a bottom of the accommodating structure;

a cooling cavity formed at a bottom of the shell, wherein the cooling cavity surrounds the shell to form the heat exchange cavity;

a water inlet pipe configured to allow inflow of cooling water, wherein the water inlet pipe is in communication with the cooling cavity; and a water outlet pipe configured to allow outflow of the cooling water, and wherein the water outlet pipe is in communication with the cooling cavity.

11. The power assembly of claim 10, wherein the heat exchange structure further comprises cooling fins disposed in the cooling cavity, and wherein the cooling fins are configured to form, in the cooling cavity, a flow channel for allowing flow of the cooling water.

12. The power assembly of claim 1, wherein the heat exchange structure further comprises cooling fins that are arranged at a bottom of the shell.

13. The power assembly of claim 9, wherein the heat dissipation structure comprises:

a rotor heat dissipation groove comprising:

a first rotor heat dissipation groove end, wherein the first rotor heat dissipation groove end is in communication with the liquid storage structure; and a second rotor heat dissipation groove end in communication with the liquid guiding hole; and a mounting part disposed in the gear cavity, wherein the mounting part comprises a liquid guiding hole disposed in the mounting part, wherein the input shaft is rotatably disposed on the mounting part, wherein the input shaft further comprises a mounting hole and a heat dissipation cavity, wherein the mounting hole is axially disposed on the input shaft, and wherein the mounting part is disposed in the mounting hole.

14. The power assembly of claim 13, further comprising a plate structure integrated with the reducer shell and defining the rotor heat dissipation groove.

15. The power assembly of claim 13, further comprising a part disposed in the reducer shell that forms the rotor heat dissipation groove.

16. An electric vehicle, comprising:

a battery configured to provide electric energy; and a power assembly configured to receive the electric energy, wherein the power assembly comprises:

a power component comprising a stator disposed in a rotating shaft cavity and configured to drive cooling liquid to flow during rotation of the power component; and a shell comprising:

an accommodating structure filled with cooling liquid and rotatably disposing the power component;

a flow diversion structure configured to guide a flow direction of the cooling liquid to flow;

a liquid storage structure configured to:

receive the cooling liquid that is guided from the flow diversion structure;

store the cooling liquid; and distribute the cooling liquid;

a heat dissipation structure comprising:

a spacer plate disposed on a top of the rotating shaft cavity and comprising a liquid guiding hole; and a stator heat dissipation groove in communication with the liquid storage structure and the accommodating structure, wherein the stator heat dissipation groove is configured to:

receive the cooling liquid from the liquid storage structure; and transfer the cooling liquid to the stator through the liquid guiding hole for cooling the power component; and a heat exchange structure configured to:

perform heat exchange on the cooling liquid in the accommodating structure; and perform cooling on the cooling liquid in the accommodating structure.

17. The electric vehicle of claim 16, wherein the shell further comprises:

a motor shell comprising the rotating shaft cavity; and a reducer shell connected to the motor shell, wherein the reducer shell comprises a gear cavity, and wherein the rotating shaft cavity and the gear cavity are in communication with each other and jointly form the accommodating structure.

18. The electric vehicle of claim 17, wherein the spacer plate and the motor shell define the stator heat dissipation groove, and wherein the liquid guiding hole is in communication with the stator heat dissipation groove and the rotating shaft cavity.

19. The electric vehicle of claim 18, wherein the spacer plate and the motor shell are integrated with each other.

20. The electric vehicle of claim 18, wherein the shell comprises a liquid storage plate that is disposed on a top of the gear cavity, wherein the liquid storage plate and the reducer shell define the liquid storage structure, and wherein the liquid storage structure is in communication with the stator heat dissipation groove.

\* \* \* \* \*